(12) United States Patent
Kruse

(10) Patent No.: US 11,008,790 B2
(45) Date of Patent: May 18, 2021

(54) TRAILER CLEANOUT PORTAL ASSEMBLY

(71) Applicant: Tim Peterson Inc., Watertown, SD (US)

(72) Inventor: Shannon Kruse, Watertown, SD (US)

( * ) Notice: Subject to any disclaimer, the term of this patent is extended or adjusted under 35 U.S.C. 154(b) by 302 days.

(21) Appl. No.: 16/274,929

(22) Filed: Feb. 13, 2019

(65) Prior Publication Data
US 2020/0256102 A1    Aug. 13, 2020

(51) Int. Cl.
| | |
|---|---|
| *E05D 15/16* | (2006.01) |
| *E06B 7/32* | (2006.01) |
| *B60J 5/06* | (2006.01) |
| *E05C 17/60* | (2006.01) |
| *B60J 5/04* | (2006.01) |

(52) U.S. Cl.
CPC ............ *E05D 15/165* (2013.01); *B60J 5/048* (2013.01); *B60J 5/062* (2013.01); *E05C 17/60* (2013.01); *E06B 7/32* (2013.01); *E05Y 2900/516* (2013.01)

(58) Field of Classification Search
CPC .... B60J 5/062; B60J 5/06; B60J 5/048; E06B 3/44; E06B 2009/002; E06B 9/01; E06B 7/32; E05D 15/165; E05C 17/60; E05Y 2900/516
See application file for complete search history.

(56) References Cited

U.S. PATENT DOCUMENTS

| | | | | |
|---|---|---|---|---|
| 5,222,287 A | * | 6/1993 | Cooper .................. | B60J 5/0491 29/401.1 |
| 5,577,355 A | * | 11/1996 | Leonelli ................ | E06B 3/5892 52/204.591 |
| 5,810,412 A | * | 9/1998 | Hall ......................... | B60P 3/04 296/24.31 |
| 6,467,226 B2 | * | 10/2002 | Dodson ..................... | E06B 1/30 52/204.1 |
| 6,793,270 B2 | * | 9/2004 | van der Vegt ............ | B60P 3/36 296/156 |
| 7,010,888 B2 | * | 3/2006 | Tumlin ................. | E06B 3/5892 52/204.56 |
| 2005/0076576 A1 | * | 4/2005 | Rijn ....................... | B60J 5/0491 49/504 |
| 2007/0204514 A1 | * | 9/2007 | Grimmett ................. | E06B 7/32 49/169 |
| 2007/0222258 A1 | * | 9/2007 | Bacco ........................ | B60J 9/02 296/182.1 |
| 2008/0149040 A1 | * | 6/2008 | Welchel ..................... | B60J 1/14 119/408 |

(Continued)

*Primary Examiner* — Justin B Rephann

(57) ABSTRACT

A trailer cleanout portal assembly includes an inner bracket attached to an inner surface of a trailer perimeter wall. The inner bracket includes a first central aperture extending therethrough that is alignable with a wall aperture in the perimeter wall. A cover bracket is attached to the inner bracket with the perimeter wall positioned between the inner and cover brackets. The cover bracket has an access aperture extending therethrough that is aligned with the first central aperture. A panel positioned between the inner bracket and the cover bracket is vertically movable to open or close the access aperture. An open space is defined extending from a lower edge of the panel and between the cover bracket and the inner bracket such that material falling between the inner and cover brackets freely falls downwardly from the assembly.

20 Claims, 7 Drawing Sheets

(56) References Cited

U.S. PATENT DOCUMENTS

| | | | | |
|---|---|---|---|---|
| 2009/0058106 A1* | 3/2009 | Bacon | .................. | E05C 1/12 |
| | | | | 292/336.3 |
| 2010/0116219 A1* | 5/2010 | Noyes | .................. | E06B 7/32 |
| | | | | 119/484 |
| 2013/0269262 A1* | 10/2013 | Siegel | .................. | B60R 13/08 |
| | | | | 49/492.1 |

* cited by examiner

TRAILER CLEANOUT PORTAL ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to trailer clean out door devices and more particularly pertains to a new trailer clean out door device for allowing removal of material from a trailer hopper which would otherwise be difficult to remove therefrom. Furthermore, the clean out door allows for material to fall through an open bottom slot in a housing of the clean out door device to prevent accumulation of material in a sliding door slot as material is removed from the trailer hopper.

BRIEF SUMMARY OF THE INVENTION

An embodiment of the disclosure meets the needs presented above by generally comprising an inner bracket configured to be attached to an inner surface of a perimeter wall of a trailer. The inner bracket includes a first central aperture extending therethrough that is alignable with a wall aperture in the perimeter wall positioned adjacent to a bottom of the trailer. A cover bracket is attached to the inner bracket such that the perimeter wall is positioned between the cover bracket and the inner bracket. The cover bracket has an access aperture extending therethrough and is aligned with the first central aperture. A panel is positioned between the inner bracket and the cover bracket. The panel is vertically movable between an open position opening the access aperture and a closed position closing the access aperture. The panel is completely covered by the cover bracket when the panel is in the closed position. An open space is defined extending from a lower edge of the panel and between the cover bracket and the inner bracket such that material falling between the inner and cover brackets freely falls downwardly from the assembly.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
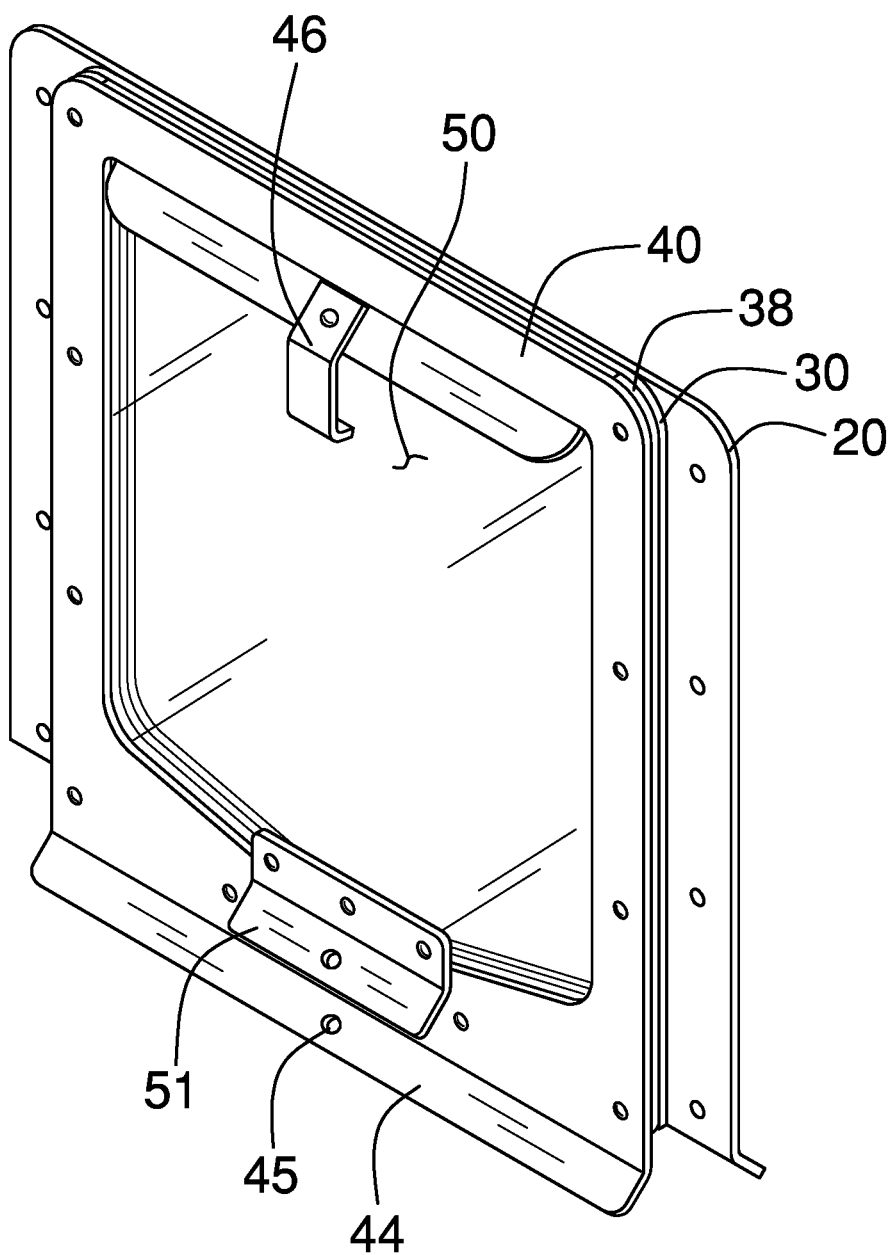
FIG. 1 is a front isometric view of a trailer cleanout portal assembly according to an embodiment of the disclosure.

With reference now to the drawings, and in particular to FIGS. 1 through 7 thereof, a new trailer clean out door device embodying the principles and concepts of an embodiment of the disclosure and generally designated by the reference numeral 10 will be described.

As best illustrated in FIGS. 1 through 7, the trailer cleanout portal assembly 10 generally comprises a device configured for mounting in a wall of a trailer 12 to facilitate emptying out thereof. The trailer 12 itself may particularly include the hopper type of trailers used to transport granular material, in particular, such as grain, which becomes coagulated while in the trailer 12 and often requires agitation to be broken up such that the grain continues to flow outwardly from the bottom of the trailer 12.

To this end the assembly 10 is mounted in the perimeter wall 14 of the trailer 12 to allow a person to extend an elongated implement, such as a broom, laterally into the trailer 12 to engage the granular material, breaking it up so that it freely flows outwardly of the trailer 12 while allowing the person to remain outside of the trailer 12.

The assembly 10 includes an inner bracket 20 that is attachable to an inner surface 15 of a perimeter wall 14 of the trailer 12. The inner bracket 20 has a first central aperture 21 extending therethrough that is alignable with a wall aperture 16 in the perimeter wall 14 positioned adjacent to a bottom of the trailer 12. The first central aperture 21 has a bottom edge 22 forming an obtuse angle of greater than 150°. The wall aperture 16 will typically have a matching shape. The inner bracket 20 has an inner perimeter edge 23 bounds the first central aperture 21 and an outer perimeter edge 24. The inner bracket 20 has a plurality of lateral fastener openings 25 extending therethrough that are positioned adjacent to a first lateral edge 26 and a second lateral edge 27 of the outer perimeter edge 24. The lateral fastener openings 25 are configured to receive wall fasteners 28 extendable through the perimeter wall 14 of the trailer 12. The lateral fastener openings 25 may be aligned with the reinforcing supports 16 of the trailer 12 to strengthen the connection between the assembly 10 and the trailer 12. The wall fasteners 28 may include any conventional fastener such as, for example, screws and rivets. The inner bracket 20 further has a plurality of inner fastener openings 29 bounding the first central aperture 21.

An outer bracket 30 is attachable to an outer surface 17 of the perimeter wall 14. The outer bracket 30 includes a second central aperture 31 that is aligned with the first central aperture 21. The second central aperture 31 has a same size and shape as the first central aperture 21. The outer bracket 30 has a plurality of mounting holes 32 each alignable with one of the inner fastener openings 29. The mounting holes 32 and the inner fastener openings 29 are configured to receive bracket fasteners 33 to secure the outer bracket 30 to the inner bracket 20, and typically the bracket fasteners 33 extend through the perimeter wall 14 of the trailer 12. The bracket fasteners 33, as with the wall fasteners 28, may comprise any fastener conventional to this structure and purpose.

Figure 5:
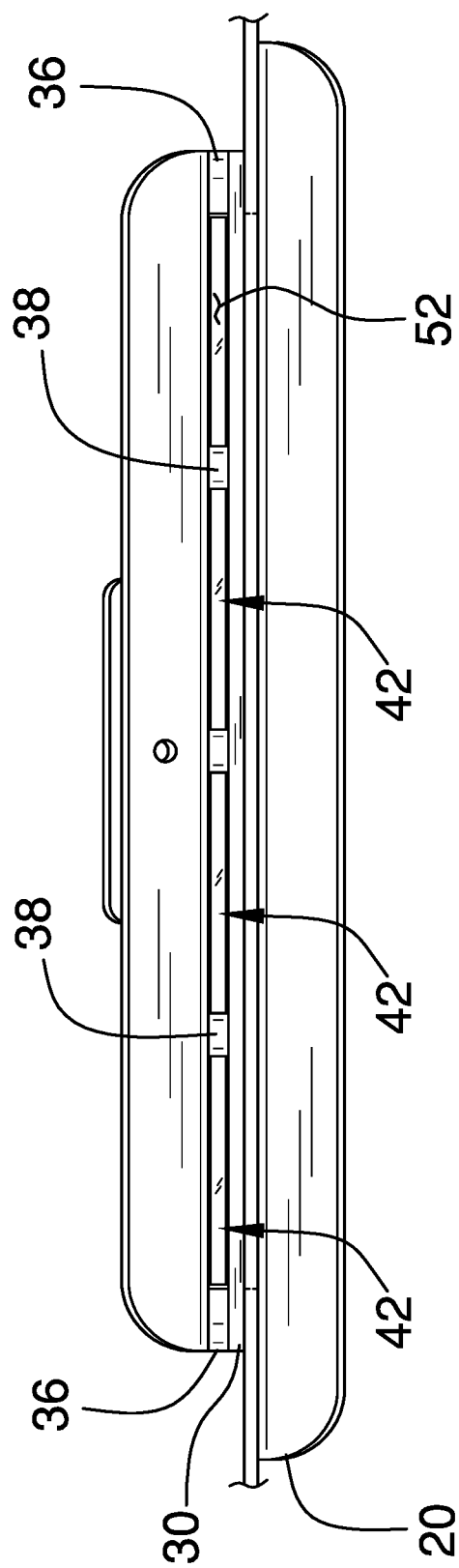
FIG. 5 is a bottom view of an embodiment of the disclosure.
Figure 6:
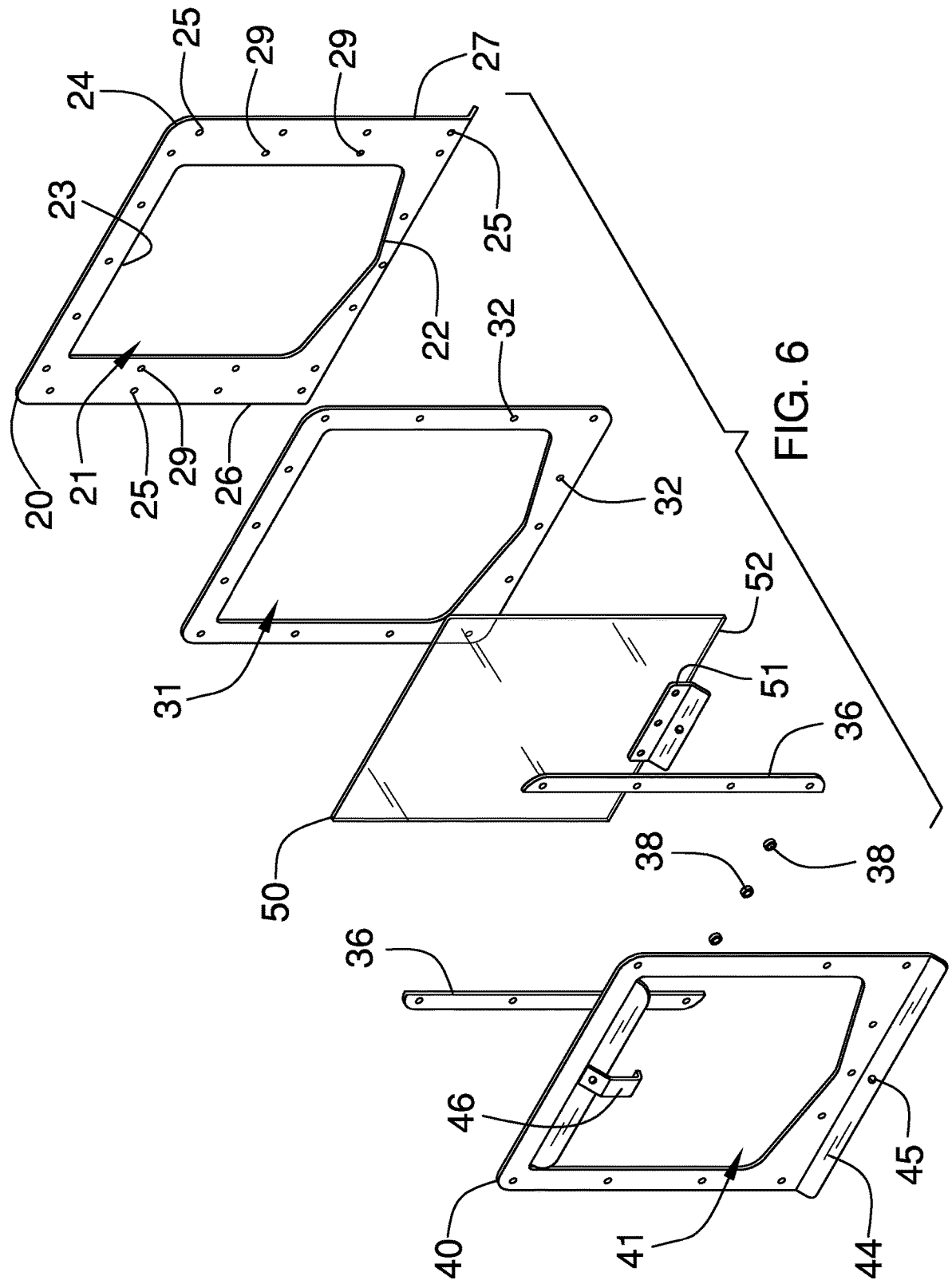
FIG. 6 is a front exploded isometric view of an embodiment of the disclosure.
Figure 7:
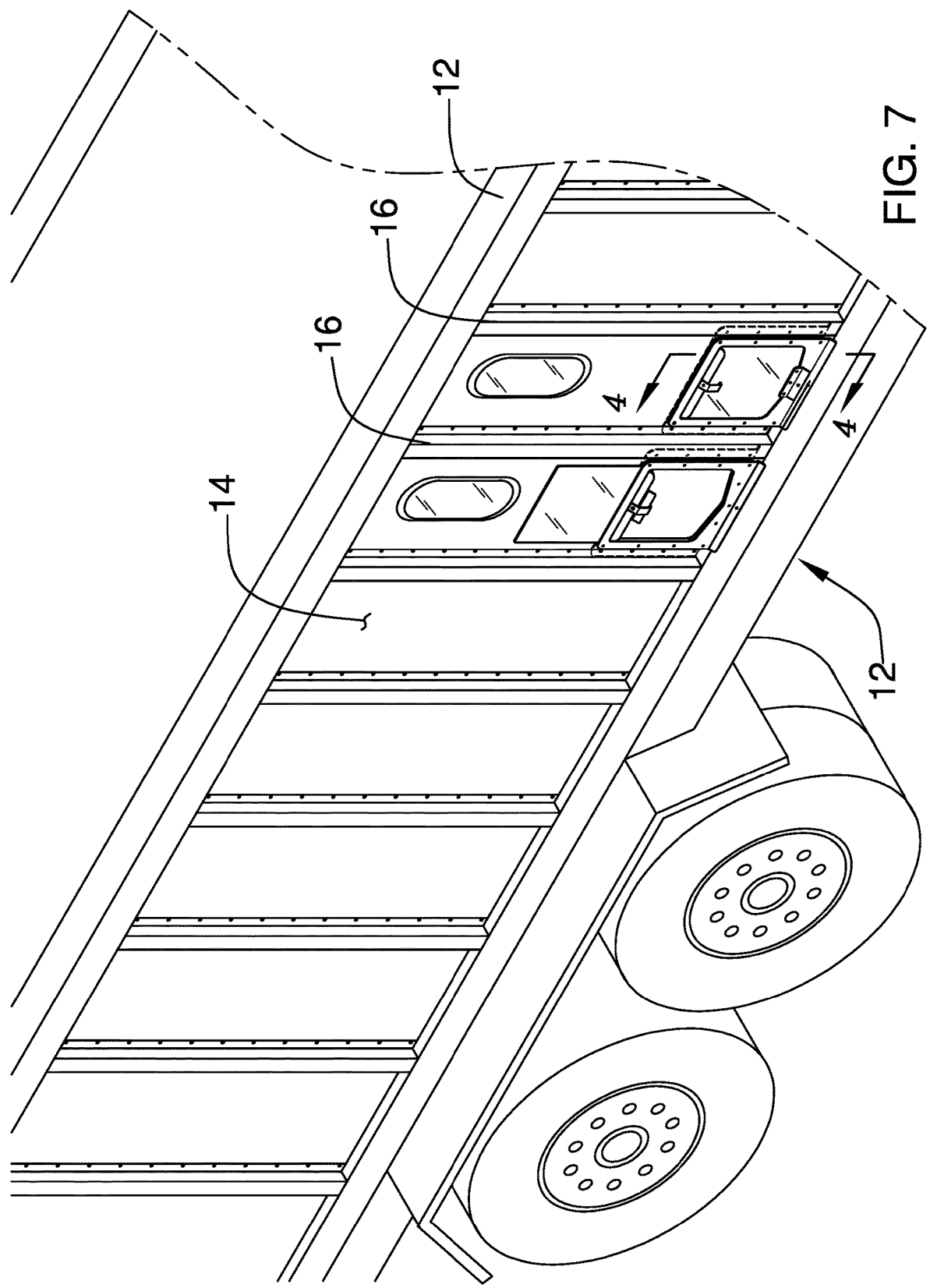
FIG. 7 is a front isometric in-use view of an embodiment of the disclosure.

A pair of side spacers 36 is attached to the outer bracket 30 such that the outer bracket 30 is positioned between the side spacers 36 and the inner bracket 20. The side spacers 36 are positioned on lateral and opposite sides of the second central aperture 31 and are vertically elongated as can be seen in FIG. 6. The side spacers 36 are configured to each receive at least two of the bracket fasteners 33. A plurality of bottom spacers 38 is attached to the outer bracket 30 such that the outer bracket 30 is positioned between the side spacers 38 and the inner bracket 20. The bottom spacers 38 are positioned below the second central aperture 31 and are laterally spaced from each other as can best be seen in FIG. 5. As can be seen in FIG. 6, the bottom spacers 38 may have a circular shape. The bottom spacers 38 are each configured to receive at least one of the bracket fasteners 33.

A cover bracket 40 is attached to the outer bracket 30. The cover bracket 40 abuts the side 36 and bottom 38 spacers such that the cover bracket 40 is spaced from the outer bracket 30 and drainage openings 42 are positioned between the bottom spacers 38. The cover bracket 40 has an access aperture 41 extending therethrough that is aligned with the second central aperture 31. The access aperture 41 may have a same size and shape as the second central aperture 31. The cover bracket 40 is configured to receive the bracket fasteners 33.

A panel 50 is positioned between the outer bracket 30 and the cover bracket 40. The panel 50 is vertically movable between an open position opening the access aperture 41 and a closed position closing the access aperture 41. The panel 50 has a handle 51 thereon to facilitate the lifting and closing of the panel 50 relative to the access aperture 41. The handle 51 is positioned proximal to a lower edge 52 of the panel 50. The panel 50 is comprised of a transparent, rigid material such as, for example, an acrylic glass, though any transparent material of sufficient strength may be utilized. The panel 50 completed closes off the access aperture 41 when the panel 50 is in the closed position. That is, the side edges and lower edge 52 of the panel 50 are completely covered by the cover bracket 40 when the panel 50 is in the closed position. Thus, the cover bracket 40 retains the panel 50 in place and prevents granular material from moving around the panel 50 when the panel 50 is in the closed position. The panel 50 lies in a plane that is coplanar with the side and bottom spacers and has a depth, or thickness, approximately equal to the depth of the bottom 38 and side 36 spacers as can be seen in FIG. 5.

A catch 44 is attached to the cover bracket 40. The catch 44 may be releasably engaged to the handle 51 when the panel 50 is in the closed position to retain the panel 50 in the closed position. As can be seen in the Figures, the catch 44 has lock receiver 45 extending therethrough. This allows a securing member, such as a padlock, to be extended through the handle 51 and the lock receiver 45 to secure the handle 51 and catch 44 together to prevent unauthorized access to the interior of the trailer 12.

Figure 2:
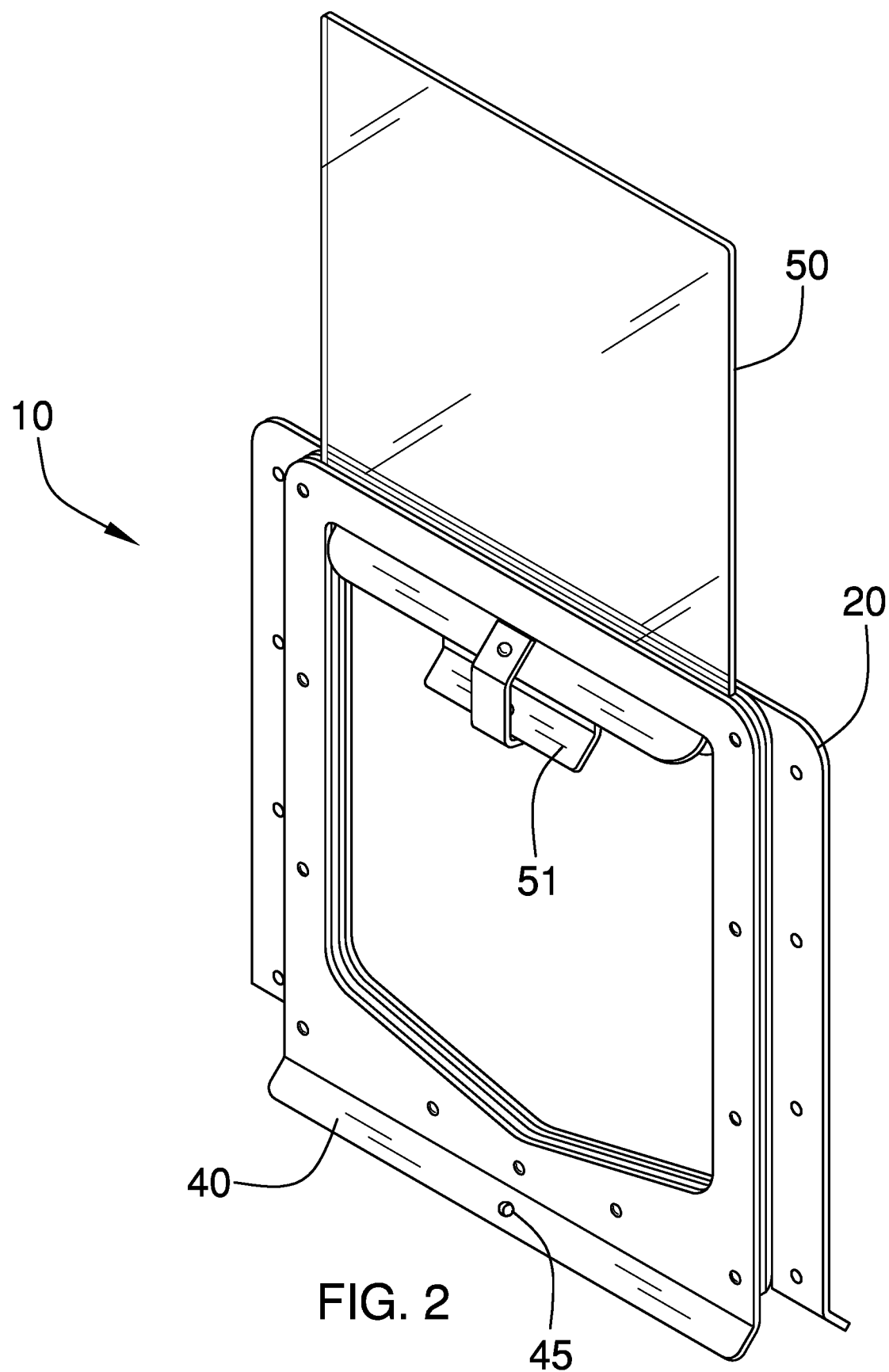
FIG. 2 is a front isometric view of an embodiment of the disclosure.
Figure 3:
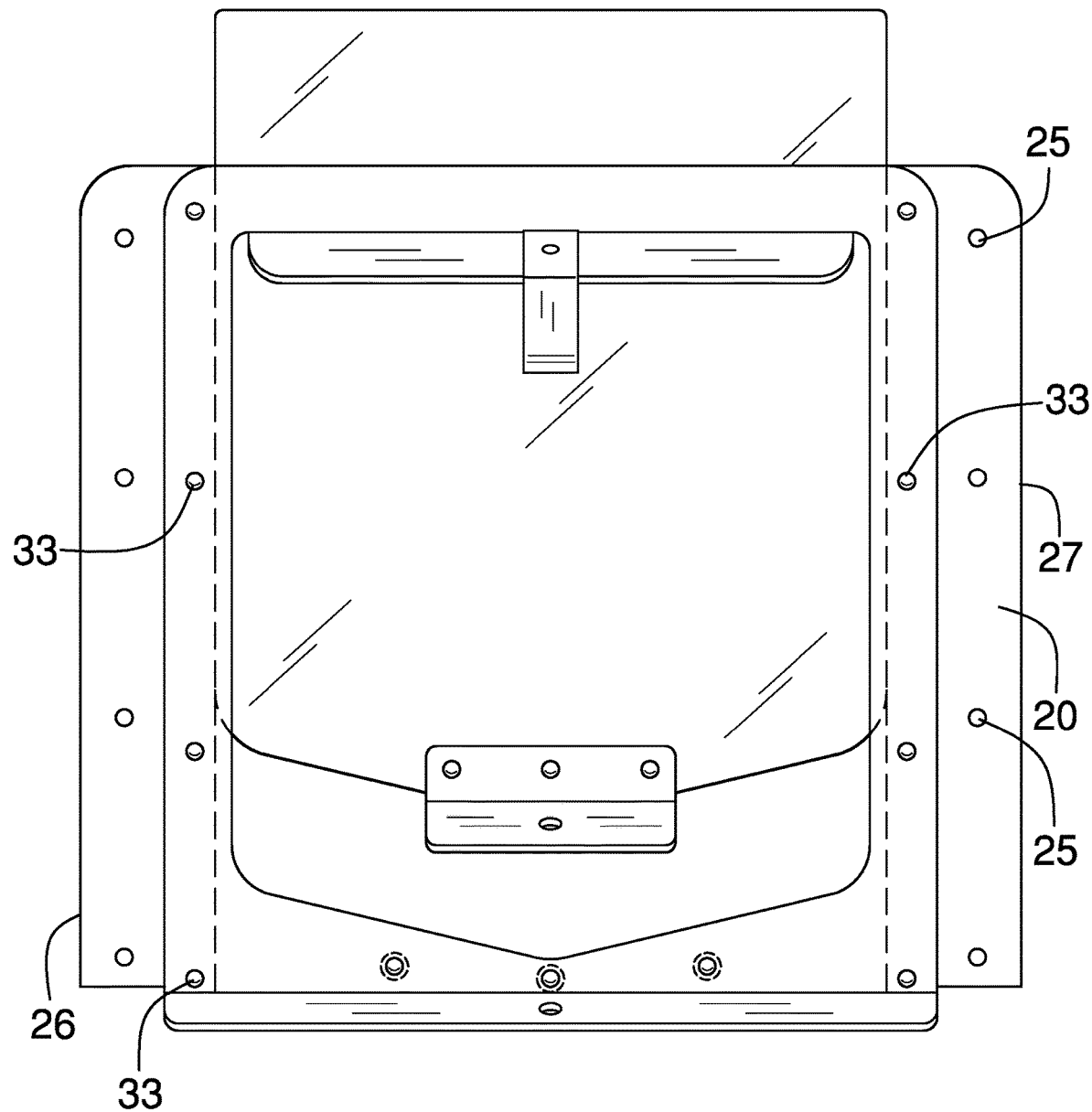
FIG. 3 is a front view of an embodiment of the disclosure.
Figure 4:
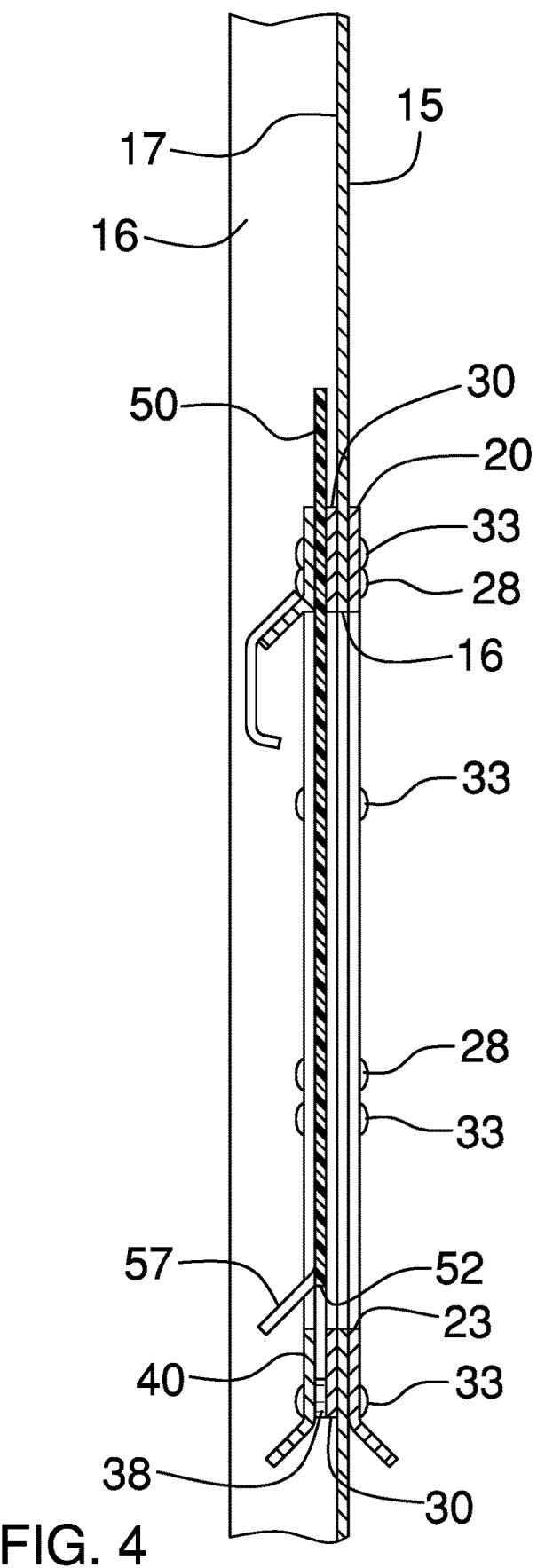
FIG. 4 is a cross-sectional view an embodiment of the disclosure taken generally along line 4-4 in FIG. 7 with a panel in a partially opened position.

A tab 46 is attached to the cover bracket 40 adjacent to an apex thereof. The tab 46 is releasably securable to the handle 51 when the panel 50 is in the open position as can be seen in FIG. 2. The tab 46 retains the panel 50 in the open position to allow the person to freely extend the implement into the trailer 12 without damaging the panel 50 or impeding the person's task.

In use, when a hopper of a trailer 12 is opened to release the material therein, the draining thereof can be viewed through the panel 50. Should the material cease to drain due to coagulation of the material, the user may open the panel 50 and extend a tool through the access aperture 41 and into the trailer 12 to engage the material such that it is agitates and properly drains outwardly of the trailer 12. The bottom spacers 38 allow material, which falls outwardly of the trailer 12 through the assembly 10, to flow between the cover bracket 40 and the outer bracket 30 so that the space therebetween does not become filled with the material and prevent the panel 50 from fully closing to seal the access aperture 41.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A lateral clean out hatch assembly configured for mounting in a wall of a trailer to facilitate emptying out thereof, said lateral clean out hatch assembly comprising:

an inner bracket configured to be attached to an inner surface of a perimeter wall of the trailer, said inner bracket including a first central aperture extending therethrough being alignable with a wall aperture in the perimeter wall positioned adjacent to a bottom of the trailer;

a cover bracket being attached to said inner bracket such that the perimeter wall is positioned between said cover bracket and said inner bracket, said cover bracket having an access aperture extending therethrough and being aligned with said first central aperture;

a panel being positioned between said inner bracket and said cover bracket, said panel being vertically movable between an open position opening said access aperture and a closed position closing said access aperture, side edges and a bottom edge of said panel being completely covered by said cover bracket when said panel is in said closed position; and an open space being defined extending from a lower edge of said panel and between said cover bracket and said inner bracket such that material falling between the inner and cover brackets freely falls downwardly from the assembly.

2. The lateral clean out hatch assembly according to claim 1, wherein said access aperture having a same size and shape as said first central aperture.

3. The lateral clean out hatch assembly according to claim 2, wherein said said first central aperture has a bottom edge forming an obtuse angle of greater than 150°.

4. The lateral clean out hatch assembly according to claim 1, wherein said inner bracket has an inner perimeter edge bounding said first central aperture and an outer perimeter edge, said inner bracket having a plurality of lateral fastener openings extending therethrough and being positioned adjacent to a first lateral edge and a second lateral edge of said outer perimeter edge, said inner bracket having a plurality of inner fastener openings bounding said first central aperture, wherein said lateral fastener openings are configured to receive wall fasteners extendable through the perimeter wall of the trailer, wherein said inner fastener openings are configured to receive bracket fasteners wherein the bracket fasteners further extend through said cover bracket.

5. The lateral clean out hatch assembly according to claim 4, further including an outer bracket being attachable to an outer surface of the perimeter wall, said outer bracket including a second central aperture being aligned with said first central aperture, said open space being positioned between said outer bracket and said cover bracket.

6. The lateral clean out hatch assembly according to claim 5, wherein said outer bracket has a plurality of mounting holes each being alignable with one of said inner fastener openings, wherein said mounting holes are configured to receive the bracket fasteners to secure said outer bracket to said inner bracket.

7. The lateral clean out hatch assembly according to claim 6, further including a plurality of bottom spacers being attached to said cover bracket and being positioned between said cover bracket and said outer, said bottom spacers being positioned below said access aperture to form said open space, said bottom spacers being laterally spaced from each other to facilitate movement of the material downwardly through said open space and outwardly from said assembly, wherein each of said bottom spacers is configured to receive one of said bracket fasteners.

8. The lateral clean out hatch assembly according to claim 7, further including a pair of side spacers being attached to said cover bracket and being positioned on opposite sides of said panel such that said side spacers are positioned between said cover bracket and said inner bracket, each of said side spacers being configured to receive at least two of said bracket fasteners.

9. The lateral clean out hatch assembly according to claim 8, wherein said panel has a handle thereon, said handle being positioned proximal to a lower edge of said panel.

10. The lateral clean out hatch assembly according to claim 9, further including a catch being attached to said cover bracket, said catch being releasably engaged to said handle when said panel is in said closed position to retain said panel in said closed position.

11. The lateral clean out hatch assembly according to claim 10, further including a tab being attached to said cover bracket, said tab being securable to said handle when said panel is in said open position.

12. The lateral clean out hatch assembly according to claim 9, further including a tab being attached to said cover bracket, said tab being securable to said handle when said panel is in said open position.

13. The lateral clean out hatch assembly according to claim 8, wherein said panel is comprised of a transparent material.

14. The lateral clean out hatch assembly according to claim 1, further including a plurality of bottom spacers being attached to said cover bracket and being positioned between said cover bracket and said inner bracket, said bottom spacers being positioned below said access aperture to form said open space, said bottom spacers being laterally spaced from each other to facilitate movement of the material downwardly through said open space and outwardly from said assembly.

15. The lateral clean out hatch assembly according to claim 14, further including a pair of side spacers being attached to said cover bracket and being positioned on opposite sides of said panel such that said side spacers are positioned between said cover bracket and said inner bracket.

16. The lateral clean out hatch assembly according to claim 1, further including an outer bracket being attachable to an outer surface of the perimeter wall, said outer bracket including a second central aperture being aligned with said first central aperture, said open space being positioned between said outer bracket and said cover bracket.

17. The lateral clean out hatch assembly according to claim 1, wherein said panel has a handle thereon, said handle being positioned proximal to a lower edge of said panel.

18. The lateral clean out hatch assembly according to claim 17, further including a catch being attached to said cover bracket, said catch being releasably engaged to said handle when said panel is in said closed position to retain said panel in said closed position.

19. The lateral clean out hatch assembly according to claim 18, further including a tab being attached to said cover bracket, said tab being securable to said handle when said panel is in said open position.

20. The lateral clean out hatch assembly according to claim 1, wherein said panel is comprised of a transparent material.

* * * * *